United States Patent
Kimura

(10) Patent No.: US 9,087,257 B2
(45) Date of Patent: Jul. 21, 2015

(54) IMAGE PICKUP APPARATUS CAPABLE OF SHOOTING AT HIGH FRAME RATE, CONTROL METHOD THEREFOR, AND STORAGE MEDIUM

(71) Applicant: CANON KABUSHIKI KAISHA, Tokyo (JP)

(72) Inventor: Masafumi Kimura, Kawasaki (JP)

(73) Assignee: CANON KABUSHIKI KAISHA (JP)

( * ) Notice: Subject to any disclaimer, the term of this patent is extended or adjusted under 35 U.S.C. 154(b) by 150 days.

(21) Appl. No.: 13/971,002

(22) Filed: Aug. 20, 2013

(65) Prior Publication Data

US 2014/0050420 A1    Feb. 20, 2014

(30) Foreign Application Priority Data

Aug. 20, 2012    (JP) ................................. 2012-181740

(51) Int. Cl.
  *G06K 9/32*    (2006.01)
  *H04N 5/232*   (2006.01)

(52) U.S. Cl.
  CPC .............. *G06K 9/32* (2013.01); *H04N 5/23232* (2013.01); *H04N 5/23277* (2013.01)

(58) Field of Classification Search
  CPC . H04N 5/23248; H04N 5/23264; H04N 5/77; H04N 5/907; H04N 5/145; H04N 1/212; H04N 2101/00; H04N 5/23229; H04N 5/23232; H04N 5/23277; H04N 5/2628; G03B 2217/005; G06K 9/32
  See application file for complete search history.

(56) References Cited

U.S. PATENT DOCUMENTS

| | | | | |
|---|---|---|---|---|
| 5,105,271 A | * | 4/1992 | Niihara | 375/240.16 |
| 5,289,274 A | * | 2/1994 | Kondo | 348/208.6 |
| 5,835,138 A | * | 11/1998 | Kondo | 348/207.99 |
| 2006/0215930 A1 | * | 9/2006 | Terui | 382/284 |
| 2008/0204566 A1 | * | 8/2008 | Yamazaki et al. | 348/208.99 |
| 2009/0073277 A1 | * | 3/2009 | Numata et al. | 348/222.1 |
| 2009/0074052 A1 | * | 3/2009 | Fukuhara et al. | 375/240.01 |
| 2009/0175496 A1 | * | 7/2009 | Kondo et al. | 382/103 |

FOREIGN PATENT DOCUMENTS

| | | |
|---|---|---|
| JP | 2007-214666 A | 8/2007 |
| JP | 2007-267232 A | 10/2007 |

\* cited by examiner

*Primary Examiner* — Jingge Wu
(74) *Attorney, Agent, or Firm* — Rossi, Kimms & McDowell LLP

(57) ABSTRACT

An image pickup apparatus which is capable of obtaining a high-quality image at high speed even when frame rate is high. A frame rate control unit controls frame rate for the shooting. An image decimation unit samples a plurality of images at predetermined time intervals and selects at least two images among the plurality of images as decimation images. A moving vector detection unit detects a moving vector indicative of a moving direction and a moving amount of a subject between the decimation images. A decimation control unit changes decimation conditions according to an absolute value of the moving vector output from the moving vector detection unit. A synthesizing unit aligns the plurality of images based on the output from the moving vector detection unit and then synthesizes the aligned plurality of images to obtain the composite image.

9 Claims, 4 Drawing Sheets

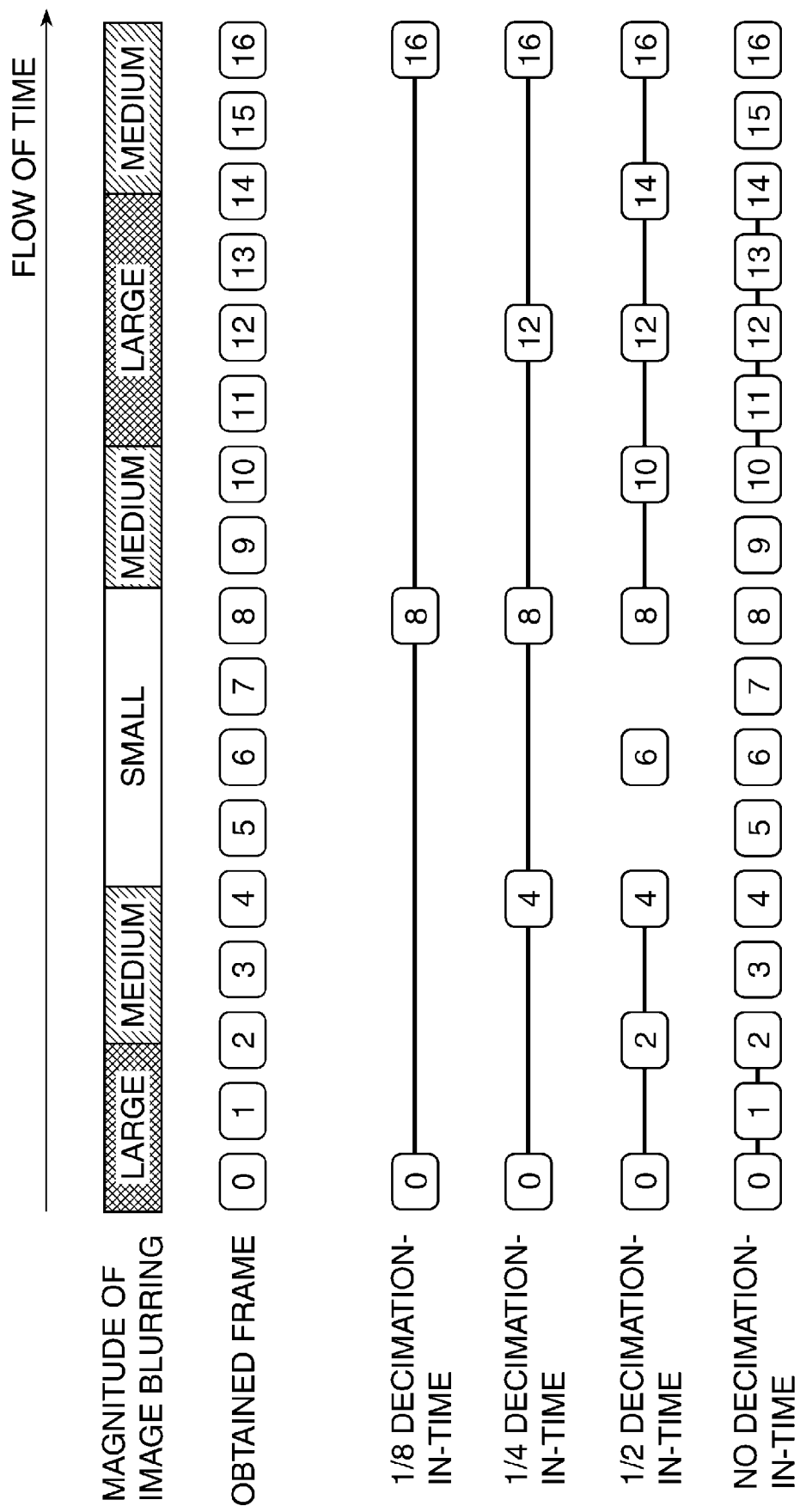

IMAGE PICKUP APPARATUS CAPABLE OF SHOOTING AT HIGH FRAME RATE, CONTROL METHOD THEREFOR, AND STORAGE MEDIUM

BACKGROUND OF THE INVENTION

1. Field of the Invention

The present invention relates to an image pickup apparatus capable of shooting at high frame rate, a control method therefor, and a computer-readable storage medium storing a control program for implementing the control method, and in particular to a technique of suppressing image degradation, which results from camera shake, using images taken at high frame rate.

2. Description of the Related Art

In general, some image pickup apparatuses such as digital cameras align a plurality of images in a plurality of frames and then synthesize the images so as to suppress image degradation resulting from camera shake. Here, frames may refer to not only frames for moving images but also respective ones of a plurality of still images when the plurality of still images are taken using a so-called continuous shooting function.

The alignment mentioned above is carried out so as to reduce the effect of image blurring caused by movement of a subject (so-called motion blur), and for example, a moving vector (motion vector) between temporally-adjacent frames is obtained. This moving vector represents a difference in the position of a subject or the like between the frames. Based on the moving vector, a plurality of images are aligned (registration process), and thereafter, the plurality of images are synthesized.

It should be noted that in the registration process, the images are aligned within a search range determined in advance.

On the other hand, there has been a method that obtains moving vectors between frames, which are not temporally adjacent to each other, so as to reduce computation loads and stabilize an image (see Japanese Laid-Open Patent Application (Kokai) No. 2007-214666). Here, a moving vector between the oldest frame and the newest frame among a plurality of frames stored in memory is computed.

Further, there has been a method that, in order to reduce computation loads required to detect a moving vector, determines a search range for use in obtaining a moving vector between the Nth frame and the (N+1)th frame based on a moving vector obtained using the (N−1) frame and the Nth frame (see Japanese Laid-Open Patent Application (Kokai) No. 2007-267232).

However, according to the methods described in Japanese Laid-Open Patent Application (Kokai) Nos. 2007-214666 and 2007-267232, if the number of images to be synthesized increases due to a rise in frame rate, the amount of computations (processing time) therefor will remarkably increase with frame rate. The increase in processing time brings about degradation in convenience for a user.

SUMMARY OF THE INVENTION

The present invention provides an image pickup apparatus which is capable of obtaining a high-quality image at high speed even when frame rate is high, a control method therefor, and a computer-readable storage medium storing a control program for implementing the control method.

Accordingly, a first aspect of the present invention provides an image pickup apparatus that aligns a plurality of images, which are obtained by continuously shooting a subject, and then synthesizes the plurality of images to obtain a composite image, comprising a frame rate control unit configured to control frame rate for the shooting, an image decimation unit configured to sample the plurality of images at predetermined time intervals and select at least two images among the plurality of images as decimation images, a moving vector detection unit configured to detect a moving vector, which is indicative of a moving direction and a moving amount of the subject, between the decimation images, a decimation control unit configured to change decimation conditions, on which the decimation unit performs the sampling, according to an absolute value of the moving vector which is an output from the moving vector detection unit, and a synthesizing unit configured to align the plurality of images based on the output from the moving vector detection unit and then synthesize the aligned plurality of images to obtain the composite image.

Accordingly, a second aspect of the present invention provides a control method for an image pickup apparatus that aligns a plurality of images, which are obtained by continuously shooting a subject, and then synthesizes the plurality of images to obtain a composite image, comprising a frame rate control step of controlling frame rate for the shooting, an image decimation step of sampling the plurality of images at predetermined time intervals and selecting at least two images among the plurality of images as decimation images, a moving vector detection step of detecting a moving vector, which is indicative of a moving direction and a moving amount of the subject, between the decimation images, a decimation control step of changing decimation conditions, on which the sampling is performed in the decimation step, according to an absolute value of the moving vector obtained in the moving vector detection step, and a synthesizing step of aligning the plurality of images based on the moving vector obtained in the moving vector detection step and then synthesizing the aligned plurality of images to obtain the composite image.

Accordingly, a third aspect of the present invention provides a non-transitory computer-readable storage medium storing a control program for use in an image pickup apparatus that aligns a plurality of images, which are obtained by continuously shooting a subject, and then synthesizes the plurality of images to obtain a composite image, the control method comprising a frame rate control step of controlling frame rate for the shooting, an image decimation step of sampling the plurality of images at predetermined time intervals and selecting at least two images among the plurality of images as decimation images, a moving vector detection step of detecting a moving vector, which is indicative of a moving direction and a moving amount of the subject, between the decimation images, a decimation control step of changing decimation conditions, on which the sampling is performed in the decimation step, according to an absolute value of the moving vector obtained in the moving vector detection step, and a synthesizing step of aligning the plurality of images based on the moving vector obtained in the moving vector detection step and then synthesizing the aligned plurality of images to obtain the composite image.

According to the present invention, a high-quality image can be obtained at high speed even when frame rate is high.

Further features of the present invention will become apparent from the following description of exemplary embodiments (with reference to the attached drawings).

BRIEF DESCRIPTION OF THE DRAWINGS

FIGS. 1A and 1B are views useful in explaining an arrangement of an exemplary image pickup apparatus according to an embodiment of the present invention, in which FIG. 1A is a cross-sectional view showing a construction of the image pickup apparatus, and FIG. 1B is a block diagram useful in explaining a control system of the image pickup apparatus.

FIG. 4 is a view useful in concretely explaining the image processing described with reference to FIG. 2.

DESCRIPTION OF THE EMBODIMENTS

A description will now be given of an exemplary image pickup apparatus according to an embodiment of the present invention with reference to the drawings.

Figure 1A:
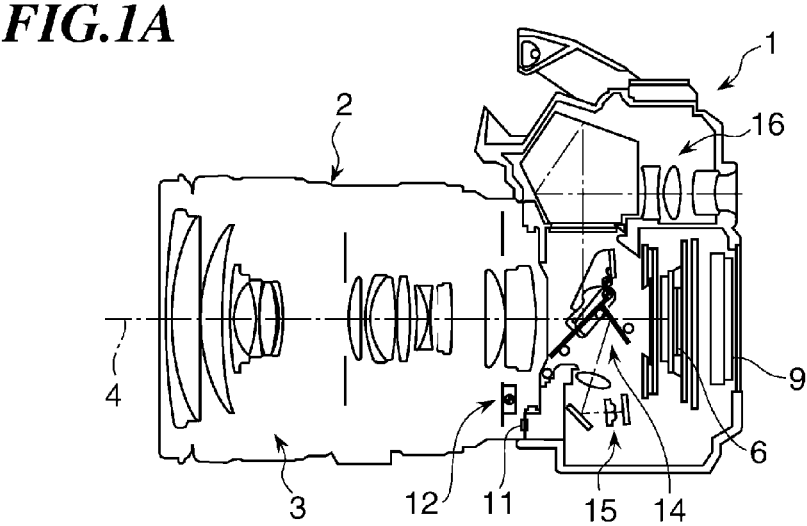
Figure 1B:
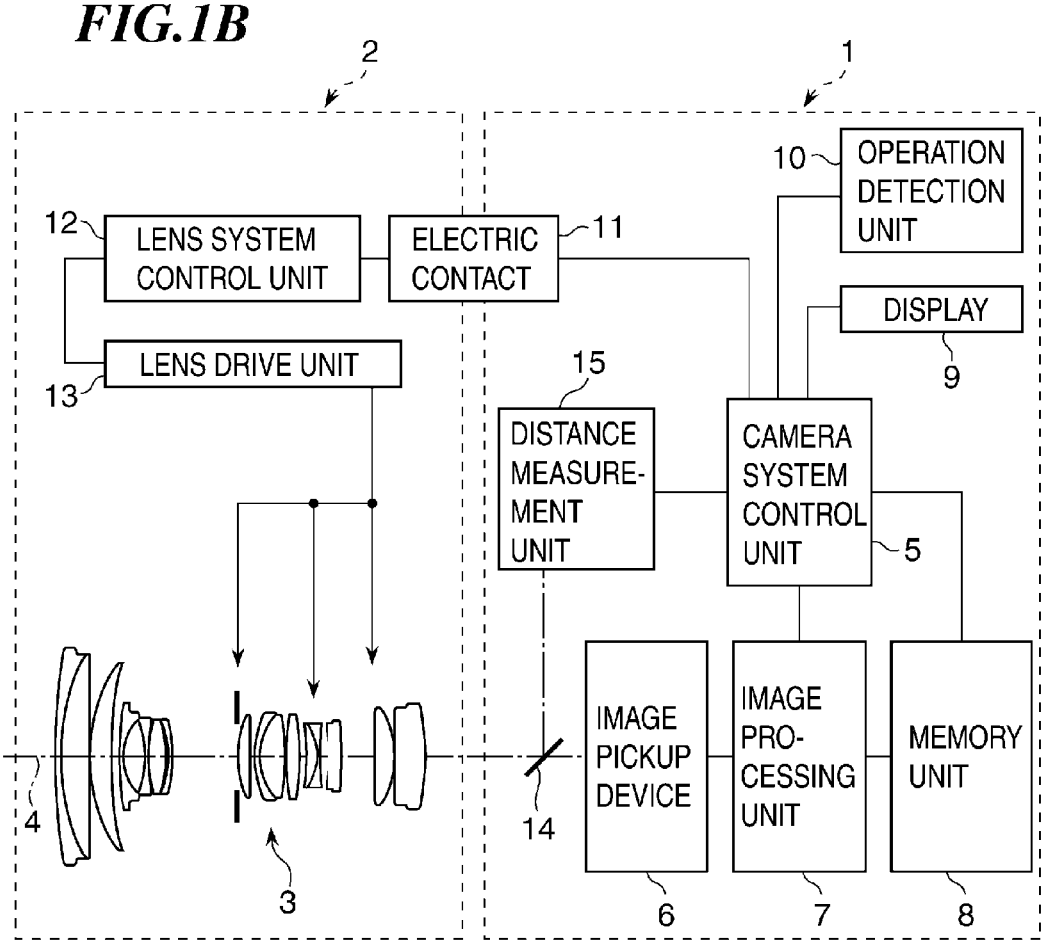

FIGS. 1A and 1B are views useful in explaining an arrangement of an exemplary image pickup apparatus according to an embodiment of the present invention. FIG. 1A is a cross-sectional view showing a construction of the image pickup apparatus, and FIG. 1B is a block diagram useful in explaining a control system of the image pickup apparatus. In the following description, it is assumed that the image pickup apparatus is a so-called single-lens reflex digital camera (hereafter referred to merely as the camera).

The camera shown in the figures has a camera main body 1 and a lens unit 2. The lens unit 2 is able to be attached to and removed from the camera main body 1. When the lens unit 2 is attached to the camera main body 1, the lens unit 2 is electrically connected to the camera main body 1 by an electric contact 11.

As shown in the figures, the lens unit 2 is equipped with a shooting optical system 3, a lens system control unit 12, and a lens drive unit 13. The camera main body 1 is equipped with a quick return mirror mechanism 14, an image pickup device 6, an image processing unit 7, a memory unit 8, a distance measurement unit 15, a camera system control unit 5, a display 9, and an operation detection unit 10.

As described above, when the lens unit 2 is attached to the camera main body 1, the camera system control unit 5 and the lens system control unit 12 are connected together via the electric contact 11. Then, under the control of the camera system control unit 5, the lens system control unit 12 causes the lens drive unit 13 to drivingly control the shooting optical system 3. It should be noted that the shooting optical system 3 includes a focus lens, an image stabilization lens, a diaphragm, and so on.

The quick return mirror mechanism 14 is located on an optical axis 4 of the shooting optical system 3. Moreover, the image pickup device 6 is disposed in a rear side in a direction of the optical axis 4 of the quick return mirror mechanism 14 (an opposing direction to the subject side).

At the time of aiming, the quick return mirror mechanism 14 causes light from the shooting optical system 3 to be guided to the distance measurement unit 15 and the optical finder 16. On the other hand, at the time of shooting (that is, at the moment of shooting), the quick return mirror mechanism 14 moves a quick return mirror up to guide an optical image to the image pickup device 6 so that the optical image can be formed on the image pickup device 6. When shooting is completed, the quick return mirror returns to its original position.

The image pickup device 6 outputs an analog signal corresponding to the optical image. Under the control of the camera system control unit 5, the image processing unit 7 converts the analog signal into a digital signal, then subjects the digital signal to image processing, and outputs resulting image data. The image data is then recorded in the memory unit 8.

The camera system control unit 5 receives the image data directly from the image processing unit 7 or reads the image data from the memory unit 8 and displays an image corresponding to the image data on a display 9 such as a liquid crystal monitor. Thus, in the case of continuous shooting or video shooting, a user can perform shooting while viewing images on the display 9.

The image processing unit 7 has, for example, an A/D converter, a white balance processing circuit, a gamma correction circuit, an interpolation computation circuit, and so on. Further, here, although not shown in the figures, the image processing unit 7 has a frame decimation unit, a moving vector detection unit, an image synthesizing unit, a pixel decimation unit, and a moving vector calculation control unit, which will be described later.

The memory unit 8 has a processing circuit required to record image data, as well as a storage unit in which image data is recorded. The memory unit 8 records image data in the storage unit and generates and stores images which are to be output to the display 9. Further, the memory unit 8 compresses image data (including video data), voice, and so on using a technique determined in advance. It should be noted that here, the memory unit 8 is equipped with a buffer unit, to be described later.

The camera system control unit 5 controls the camera main body 1 and the lens unit 2 in response to external operations. For example, when the operation detection unit 10 detects depression of a shutter release button (not shown), the camera system control unit 5 controls actuation of the image pickup device 6, operation of the image processing unit 7, compression processing performed by the memory unit 8, and so on. Further, the camera system control unit 5 controls conditions of segments by displaying various types of information on the display 9.

As shown in the figures, the distance measurement unit 15 and a photometric unit (not shown) are connected to the camera system control unit 5, and a focal position and an aperture position are obtained based on a distance measurement result and a photometric result obtained by the distance measurement unit 15 and the photometric unit. Then, based on the focal position and the aperture position, the camera system control unit 5 then controls the lens system control unit 12 via the electric contact 11. The lens system control unit 12 drivingly controls the lens drive unit 13 to adjust the focus lens and the diaphragm based on the focal position and the aperture position.

A camera shake detection sensor (not shown) is connected to the lens system control unit 12. When an image stabilization mode is selected, the lens system control unit 12 causes the lens drive unit 13 to drivingly control the image stabilization lens based on a camera shake detection result obtained by the camera shake detection sensor.

In the camera shown in the figures, the camera system control unit 5 controls a rate at which the image pickup device 6 obtains images (a so-called frame rate). Namely, here, the camera system control unit 5 acts as a frame rate control unit. Further, the camera system control unit 5 has a decimation control unit, to be described later.

At the time of taking still images or moving images, it is important to properly control frame rate. It should be noted that there may be cases where still images are continuously obtained by continuous shooting or the like and aligned, and hence, for still images as well, the rate at which shots are continuously taken is referred to as a frame rate.

If camera shake is added to the camera when images are taken, degradation of subject images will occur. In order to avoid such degradation of subject images, frame rate should be increased to shorten exposure time for each image.

In a case where the exposure time is shortened, increasing gain so as to make up for an underexposure result in noise increase. Therefore, a plurality of images are aligned in accordance with a desired exposure time and then synthesized to obtain a composite image. Specifically, the camera system control unit 5 obtains a plurality of images at a higher frame rate than an exposure time in shooting, performs image processing, to be described later, to obtain and output a composite image corresponding to a desired exposure time.

For example, when one still image with an exposure time of 1/30 [s] is to be taken, the camera system control unit 5 sets a frame rate to 240 fps (an exemplary speed higher than 1/30) to obtain eight images. Then, the camera system control unit 5 synthesizes the eight images to output one still image corresponding to the exposure time of 1/30 [s]. On this occasion, the images may be displaced due to camera shake, the camera system control unit 5 aligns the eight images relatively to each other and then synthesizes the eight images.

A predetermined amount of computations are required to align and synthesize a plurality of images. If a number of images are to be synthesized at an increased frame rate at which images are obtained, the amount of computations required for this will dramatically increase.

On the other hand, in order to reduce image blurring in each frame to a satisfactory level, it is necessary to increase frame rate. Further, the amount of data that can be processed in a unit time tends to increase due to recent technology advancement, and it is thus possible to increase frame rate at which images are obtained.

Figure 2:
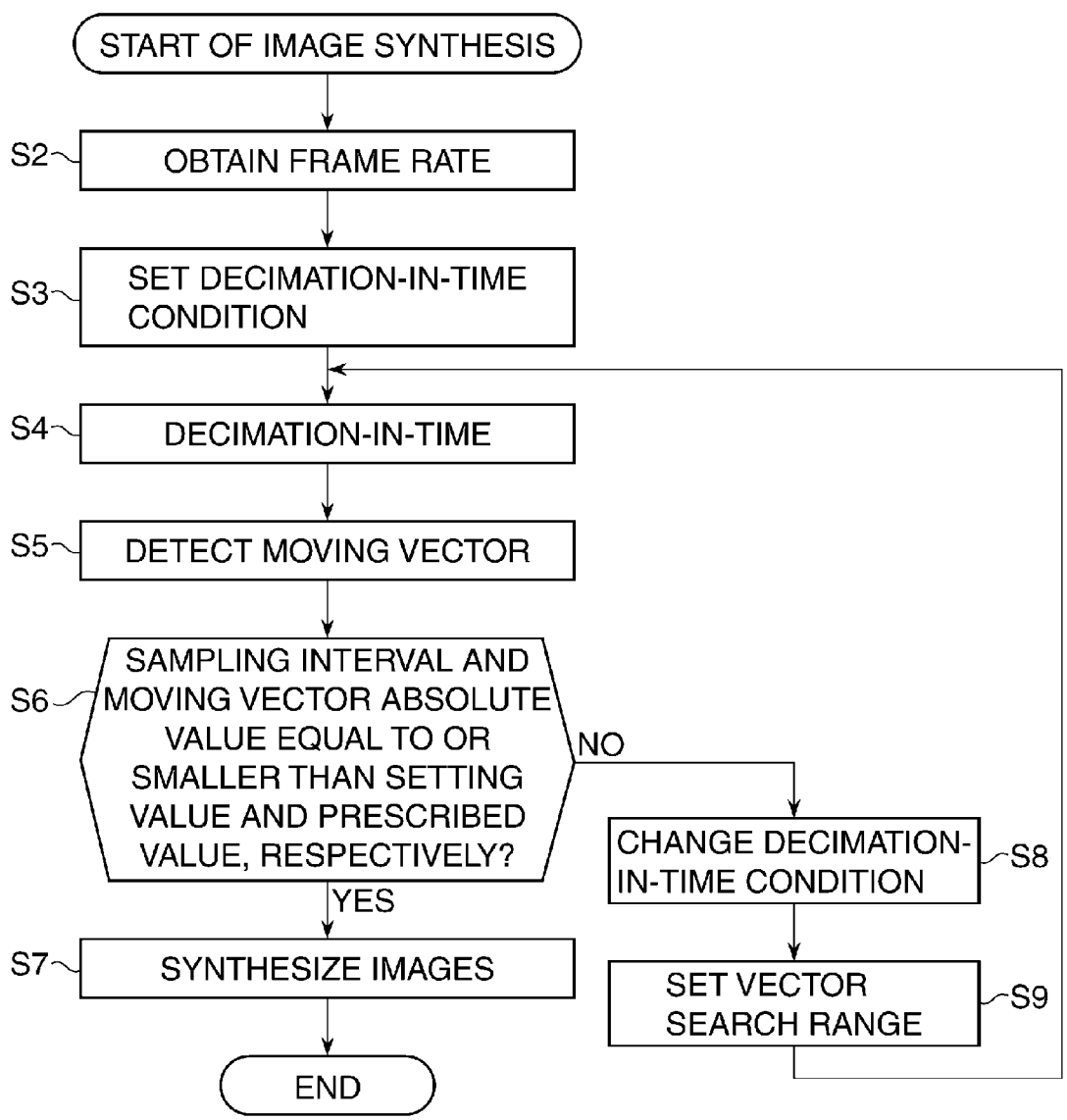
FIG. 2 is a flowchart useful in explaining an example of image processing in the image pickup apparatus appearing in FIGS. 1A and 1B.

FIG. 2 is a flowchart useful in explaining an example of image processing in the camera appearing in FIGS. 1A and 1B. It should be noted that FIG. 2 shows a process to carry out decimation-in-time and synthesize images. Here, decimation-in-time means decimating temporally continuous frames to decrease sampling frequency in a time direction. In the following description, it is assumed, for example, that a still image corresponding to an exposure time of 1/30 [s] is obtained by synthesizing images obtained at a frame rate of 240 fps.

When image processing is started, the camera system control unit 5 obtains a frame rate setting value for use in taking images (step S2). This frame rate setting value is obtained, for example, from the operation detection unit 10 that detects user operation.

Then, the camera system control unit 5 sets decimation-in-time conditions in accordance with the frame rate setting value (step S3). Here, an initial value for decimation is set such that the higher the frame rate setting value, the looser. On the other hand, the initial value for decimation is set such that the lower the frame rate setting value, the denser.

When the user holds the camera, the speed of camera shake is usually held down to some extent. Namely, because human hands are soft, it is unlikely that the camera widely moves at high frequency. For this reason, when shooting is performed at high frame rate, the amount of decimation is made small so that frames can be dense, time intervals between frames are short, and as a result, unnecessary computations are performed. Thus, as described above, decimation-in-time conditions are set according to a frame rate setting value.

For example, when shooting is performed at very high frame rate such as 8000 fps, and frames are decimated so that an exposure time can be 1/8 [S], a sampling rate in a time direction is 1000 fps for even images after decimation. When the user holds the camera, the camera does not widely move at high frequency as mentioned above, that is, angular velocity is low, and when a the frame rate is 1000 fps, an image is not conspicuously blurred as long as the focal length of a lens is not long.

It is said that image blurring of a still image is not conspicuous as long as the exposure time is (1/focal length), and therefore, if the frame rate is 1000 fps, image blurring is not conspicuous as long as the focal length of a lens is 1000 mm. It should be noted that such a lens with a long focal length is rarely used in ordinary shooting.

Thus, when the frame rate is extremely high, it is preferred that frames are decimated by a large amount so that the exposure time can be (1/focal length). Time sampling at this level may cause a displacement of several pixels in images between frames on an image pickup device. Here, "several" means a typical numeric value; sometimes there is no displacement, and sometimes there is a displacement of about ten pixels.

Specifically, when shooting is being performed using a lens with a focal length of 35 mm, the frame rate can be 31.25 fps by decimation to about 1/256 [s].

The maximum value of the displacement can be roughly estimated based on time sampling (decimation) in the step S3 and a focal length of the shooting optical system 3. This is synonymous with image blurring being not conspicuous in a still image as long as the exposure time is (1/focal length). The maximum value of the displacement mentioned above can be used as a search range in detecting a moving vector in step S5, to be described later.

Next, under the control of the camera system control unit 5, the image processing unit 7 carries out decimation-in-time according to the decimation-in-time conditions (step S4). In the decimation process in the step S4, decimation may be simply carried out, but as will be described later, addition may be performed so as to suppress aliasing in a time direction.

Then, under the control of the camera system control unit 5, the image processing unit 7 obtains a moving vector (a motion vector of a subject) between images after decimation (step S5). In the step S5, the image processing unit 7 obtains a moving direction of and a distance between two images so as to align the images.

It should be noted that the moving vector may be obtained using any method, and here, so-called block matching is used to detect the moving vector.

Then, under the control of the camera system control unit 5, the image processing unit 7 determines whether or not the interval between time sampling in accordance with the decimation-in-time conditions and the absolute value of the moving vector (that is, moving amount) are equal to or smaller than a predetermined setting value and a predetermine prescribed value, respectively (step S6). When the interval between time sampling is equal to or smaller than the setting value and the absolute value of the moving vector is equal to or smaller than the prescribed value (for example, not more than ±2 pixels), it can be determined that a subject or the like has not moved in the present sampling.

This is synonymous with, as described earlier, image blurring occurring at not more than a predetermined magnitude (angular velocity) when a human holds the camera as described earlier. As a result, as will be described later, it can be determined that a subject or the like has not moved between certain frames, and subsequent computations can be canceled.

When the interval between time sampling and the absolute value of the moving vector are equal to or smaller than the predetermined setting value and the prescribed value, respectively (YES in the step S6), that is, when the computation discontinuing conditions are satisfied with respect to all the frames or when the interval between time sampling becomes equal to the frame rate at which the images were obtained, the image processing unit 7 aligns the images in the respective frames based on the moving vector to synthesize the images under the control of the camera system control unit 5 (step S7). The camera then terminates the image synthesizing process.

When the computation discontinuing conditions are not satisfied with respect to all frames and the interval between time sampling is not equal to the frame rate at which the images were obtained (NO in the step S6), the camera system control unit 5 changes the decimation-in-time conditions (step S8). Here, the camera system control unit 5 changes the decimation-in-time conditions so that the decimation-in-time conditions can be dense. It should be noted that the decimation-in-time is carried out based on powers of 2 so as to use previous computation results while computations are recursively performed. Namely, in the step S8, time sampling frequency after decimation-in-time is doubled (frames to be used in computations are doubled).

Then, the camera system control unit 5 sets a moving vector search range (step S9). At default, it is necessary to detect moving vectors between all frames, but for frames that satisfy the discontinuing conditions in the step S6, it is unnecessary to detect moving vectors, and hence a moving vector search range is set with those frames excluded.

After that, the processes in the steps S4 and S5 are carried out again. It should be noted that when, in the step S5, there is a previous computation result (detection result), the half of a moving vector can be set as an initial value as will be described later.

Figure 3:
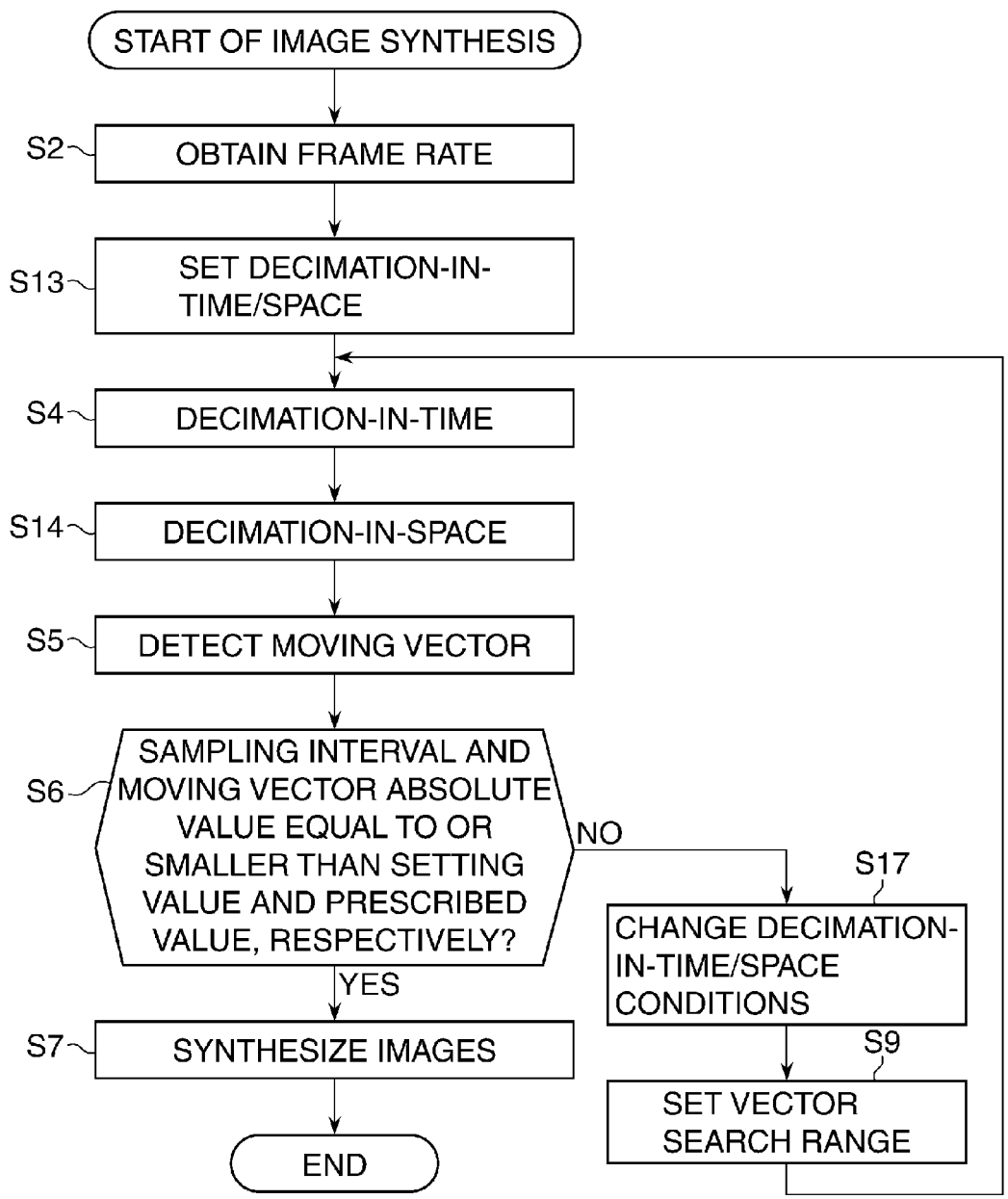
FIG. 3 is a flowchart useful in explaining another example of image processing in the image pickup apparatus appearing in FIGS. 1A and 1B.

FIG. 3 is a flowchart useful in explaining another example of image processing in the camera appearing in FIGS. 1A and 1B. It should be noted that FIG. 3 shows a process to carry out decimation-in-time and decimation-in-space and synthesize images. Here, decimation-in-space means decreasing sampling frequency in a space direction by changing sampling intervals. In FIG. 3, the same steps as those in FIG. 2 are denoted by the same reference symbols.

After obtaining a frame rate setting value in the step S2, the camera system control unit 5 sets decimation-in-time conditions and decimation-in-space conditions (step S13). It should be noted that the density as a decimation-in-space condition may be set in accordance with the decimation-in-time conditions, or the decimation-in-time conditions and the decimation-in-space conditions may be set independently of each other.

However, when sampling intervals in a time direction are to be decreased in decimation-in-time, it is preferred that sampling intervals in a space direction as well are decreased. Namely, images are roughly aligned by sampling them in a temporally skipping manner so that the images can be rough mosaic. Then, the images are gradually brought into a temporally and spatially dense state and aligned with precision.

After carrying out decimation-in-time in the step S4, the image processing unit 7 carries out decimation-in-space under the control of the camera system control unit 5 (step S14). Here, pixel data (hereafter referred to merely as pixels) in images are decimated according to the decimation-in-space conditions. As a result, images are turned into compressed images with a small number of pixels. It should be noted that in the step S14, pixels may be simply decimated, but it is preferred that addition is performed so as to suppress aliasing in a space direction.

When in the step S6, the computation discontinuing conditions are not satisfied with respect to all frames and the time sampling interval is not equal to the frame rate at which the images were obtained, the camera system control unit 5 changes the decimation-in-time conditions and the decimation-in-space conditions (step S17). Here, as describe earlier, the decimation-in-space conditions are changed so that sampling in a space direction as well can be dense.

FIG. 4 is a view useful in concretely explaining the image processing described with reference to FIG. 2.

Referring to FIG. 4, assume now that the 0th to 16th frames (that is, images) have been obtained. The magnitude of camera shake by the user varies with time. It is assumed here that magnitudes of camera shake are classified into "large", "medium", and "small", and the magnitude of camera shake varies in a time direction from "large" to "medium", "small", "medium", "large", and "medium" in this order.

It is further assumed that "1/8 decimation-in-time", "1/4 decimation-in-time", "1/2 decimation-in-time", and "no decimation-in-time" are selectively set as decimation-in-time conditions. It should be noted that in the following description, a focal length of a taking lens is 80 nm, and a composite image corresponding to an exposure time of 1/30 [s] is obtained by synthesis. This relationship between the focal length and the exposure time is a condition that generally requires attention to degradation of images due to camera shake because of exposure for a longer period of time than (1/focal length).

Here, the 0th to 16th frames, that is, 17 images are synthesized. This corresponds to, for example, a case where a still image corresponding to an exposure time of 1/30 [s] is generated from images sampled at a frame rate of 480 fps. In this case, images corresponding in number to a power of 2 or (a power of 2+1) including the number of added images are temporarily buffered in the memory unit 8. Namely, images corresponding to a time not less than an exposure time of an output image or longer and corresponding to a frame rate×(a power of 2+1) are buffered.

Here, in the step S2 in FIG. 2, the camera system control unit 5 obtains 480 fps as a frame setting value. Then, in the step S3, the camera system control unit 5 sets "1/8 decimation-in-time" as a decimation-in-time condition. As a result, a frame rate after decimation is 60 fps.

In 1/8 decimation-in-time, the 0th, 8th, and 16th frames are selected (at least two images are selected). Specifically, assuming that the 0th frame is always selected, in 1/8 decimation-in-time, frames are selected beginning with the 0th frame so that frames can be 1/8, and decimation is performed in a time direction.

It should be noted that although in the example shown in FIG. 4, the 0th, 8th, and 16th frames are simply selected, a method that, for example, adds neighboring frames may be used. In this case, the number of frames to be buffered is required to be greater than 17.

For example, an image obtained by addition of the 0th to 7th frames is used in place of the 0th frame, and an image obtained by addition of the 8th to 15th frames is used in place of the 8th frame. On this occasion, an image obtained by addition of the 16th to 23rd frame is used in place of the 16th frame. For this reason, here, the 0th to 23rd frames are buffered in the memory unit 8.

Although in the example shown in FIG. 4, (a power of 2+1) images are buffered, the 15th frame may be used in place of the 16th frame when a power of 2 is more convenient because of memory limitations. Namely, the 15th frame and the 16th frame are regarded as the same images, and a moving vector from the 15th frame to the 16th frame is exactly 0. This can limit the number of images to be buffered to a power of 2.

In the step S5, moving vectors between the 0th, 8th, and 16 frames are detected. In FIG. 4, frames for which a moving vector is to be detected are linked together by a solid line. Namely, in 1/8 decimation-in-time, a moving vector between the 0th frame and the 8th frame is obtained, and then, a moving vector between the 8th frame and the 16th frame is obtained.

After the moving vectors are detected, whether or not to abort computations is determined in the step S6. As described above, a frame rate after decimation and the absolute value of a moving vector are used as discontinuing conditions.

When decimation is carried out such that the frame rate is decreased to a very small value (for example, 1 fps), it is thought that images are blurred temporarily and then return to their original positions. When, in this state, it is determined that image blurring has not occurred, images cannot be aligned well. Therefore, it is preferred that the speed of camera shake is predicted based on the above described setting value and prescribed value or an output from the camera shake detection sensor at the time of shooting, and a frame rate at which abortion is started is determined.

In 1/8 decimation-in-time shown in FIG. 4, as a result of the discontinuing determination, the process proceeds to the step S8. In the step S8, decimation-in-time conditions are changed. Here, decimation-in-time conditions are changed from 1/8 decimation-in-time to 1/4 decimation-in-time. Further, a moving vector search range is set in the step S9.

In 1/4 decimation-in-time, the 0th, 4th, 8th, 12th, and 16th frames are selected, and moving vectors are detected with respect to these frames. Then, in the step S6, the discontinuing determination is carried out again.

In the example shown in FIG. 4, the discontinuing conditions are satisfied between the 4th frame and the 8th frame. Namely, because image blurring is "small" between the 4th frame and the 8th frame, and hence the absolute value of a moving vector obtained between the 4th frame and the 8th frame is considered to be sufficiently small. In this case, an error in alignment in image synthesis lies inside a permissible range. Thus, in this case, moving vector interpolation is performed by setting a moving vector search range in the step S9 without detecting a moving vector between the 4th frame and the 8th frame.

In 1/4 decimation-in-time shown in FIG. 4, as a result of the discontinuing determination, the process proceeds to the step S8. In the step S8, decimation-in-time conditions are changed. Here, decimation-in-time conditions are changed from 1/4 decimation-in-time to 1/2 decimation-in-time. Further, as described above, a moving vector search range is set in the step S9.

In 1/2 decimation-in-time, the 0th, 2nd, 4th, 6th, 8th, 10th, 12th, 14th, and 16th frames are selected, and moving vectors are detected with respect to these frames. Then, the discontinuing determination is carried out again in the step S6.

It should be noted that as described earlier, a moving vector search range for the 0th frame and the 2nd frame should be set to the half of a moving vector search range for the 0th frame to the 4th frame. Also, a moving vector search range for the 4th frame and the 6th frame should be set to the half of a moving vector search range for the 4th frame to the 8th frame.

Specifically, in a situation where moving vectors have been accurately obtained, when a moving vector between the 0th frame and the 2nd frame and a moving vector between the 2nd frame and the 4th frame are synthesized, a moving vector between the 0th frame and the 4th frame is supposed to be obtained. Thus, for an initial value of a moving vector between the 0th frame and the 2nd frame, only an area around a midpoint between the 0th frame and the 4th frame, which is regarded as a center point, should be searched, and hence the amount of computations required for detection can be reduced. It should be noted that in the first search, a search range should be set with allowance by setting a center value for search at 0.

In the above described way, moving vectors are set such that moving vectors from the 4th frame to the 8th frame, for which detection has been discontinued, are interpolated. Specifically, assuming that there is a displacement of +2 pixels between 4th frame and the 8th frame 8, a displacement of +1 pixel is set for the 4th frame to the 6th frame. Likewise, a deviation of +1 pixel is set for the 6th frame to the 8th frame as well.

When moving vectors are to be detected, detection is not performed for the 4th frame to the 6th frame and the 6th frame to the 8th frame, for which detection has been discontinued, and moving vectors (initial values) obtained by 1/4 decimation-in-time are held.

Then, in the process in the step S6, detection of moving vectors for sections other than sections with a large amount of image blurring is discontinued. The process then proceeds to the step S8, in which "no decimation-in-time" is set as a decimation-in-time condition. As a result, in detection of moving vectors in the step S5, moving vectors between the 0th frame and the 2nd frame and between the 10th frame and the 14th frame are detected.

In the example shown in the figure, when "no decimation-in-time" is set as a decimation-in-time condition, computation discontinuing conditions are satisfied in all the frames, and the process proceeds to the step S7, in which images are aligned and synthesized.

In the example shown in FIG. 4, although "1/8 decimation-in-time" is set as a decimation-in-time condition first, decimation is started from a looser state if there are a large number of images due to high frame rate. As a result, the discontinuing conditions are satisfied before "no decimation-in-time" is set as a decimation-in-time condition, that is, in an early stage. As a result, when frame rate is high, the amount of computations can be effectively reduced.

In other words, in shooting at high frame rate, a large amount of substantially the same images are obtained, and thus, within a range of a permissible circle of confusion, it is unnecessary to individually obtain moving vectors, and hence the amount of computations can be considerably reduced.

It should be noted that the description referring to FIG. 4 is given in accordance with the process based on the flowchart in FIG. 2, but in the flowchart of FIG. 3, decimation-in-space should be performed in accordance with decimation-in-time, and hence they can be performed with ease based on the description of FIG. 4. Namely, pixels should be decimated based on decimation-in-time conditions such as 1/8 decimation-in-time.

As described above, according to the embodiment of the present invention, images taken at high frame rate can be aligned and synthesized with a decreased amount of computations. As a result, high-quality images can be obtained at high speed.

As is apparent from the above description, in the example shown in FIGS. 1A and 1B, the camera system control unit 5 acts as a frame rate control unit and a decimation control unit. Also, the camera system control unit 5 and the image processing unit 7 act as an image decimation unit, a moving vector detection unit, a synthesizing unit, and a pixel decimation unit. It should be noted that the memory unit 8 acts as a buffer unit.

OTHER EMBODIMENTS

Aspects of the present invention can also be realized by a computer of a system or apparatus (or devices such as a CPU or MPU) that reads out and executes a program recorded on a memory device to perform the functions of the above-described embodiment(s), and by a method, the steps of which are performed by a computer of a system or apparatus by, for example, reading out and executing a program recorded on a memory device to perform the functions of the above-described embodiment(s). For this purpose, the program is provided to the computer for example via a network or from a recording medium of various types serving as the memory device (e.g., computer-readable medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2012-181740 filed Aug. 20, 2012, which is hereby incorporated by reference herein in its entirety.

What is claimed is:

1. An image processing apparatus that aligns a plurality of images, which are obtained by continuously shooting a subject, and then synthesizes the plurality of images to obtain a composite image, comprising:
    an image decimation unit configured to sample the plurality of images at predetermined time intervals and select at least two images among the plurality of images as decimation images;
    a moving vector detection unit configured to detect a moving vector, which is indicative of a moving direction and a moving amount of the subject, between the decimation images;
    a decimation control unit configured to change decimation conditions, on which said image decimation unit performs the sampling, according to an absolute value of the moving vector which is an output from said moving vector detection unit; and
    a synthesizing unit configured to align the plurality of images based on the output from said moving vector detection unit and then synthesize the aligned plurality of images to obtain the composite image.

2. The image processing apparatus according to claim 1, further comprising a pixel decimation unit configured to, when said image decimation unit performs the sampling, decimate a predetermined number of pixel data pieces from the sampled images to reduce the sampled images in size.

3. The image processing apparatus according to claim 1, wherein said decimation control unit changes the decimation conditions when the absolute value of the moving vector is greater than a prescribed value prescribed in advance.

4. The image processing apparatus according to claim 3, wherein said decimation control unit changes the decimation conditions when a time interval in the sampling is greater than a setting value set in advance.

5. The image processing apparatus according to claim 4, wherein said moving vector detection unit discontinues detection of the moving vector for the decimation images when the time interval in the sampling is equal to or smaller than the setting value, and the absolute value of the moving vector is equal to or smaller than the prescribed value.

6. The image processing apparatus according to claim 1, further comprising a buffer unit configured to hold the plurality of images taken by performing shooting for a longer time than an exposure time set in advance.

7. The image processing apparatus according to claim 6, said buffer unit holds images corresponding in number to a power of 2.

8. A control method for an image processing apparatus that aligns a plurality of images, which are obtained by continuously shooting a subject, and then synthesizes the plurality of images to obtain a composite image, comprising:
    an image decimation step of sampling the plurality of images at predetermined time intervals and selecting at least two images among the plurality of images as decimation images;
    a moving vector detection step of detecting a moving vector, which is indicative of a moving direction and a moving amount of the subject, between the decimation images;
    a decimation control step of changing decimation conditions, on which the sampling is performed in said image decimation step, according to an absolute value of the moving vector obtained in said moving vector detection step; and
    a synthesizing step of aligning the plurality of images based on the moving vector obtained in said moving vector detection step and then synthesizing the aligned plurality of images to obtain the composite image.

9. A non-transitory computer-readable storage medium storing a control program for use in an image processing apparatus that aligns a plurality of images, which are obtained by continuously shooting a subject, and then synthesizes the plurality of images to obtain a composite image, the control method comprising:
    a frame rate control step of controlling frame rate for the shooting;
    an image decimation step of sampling the plurality of images at predetermined time intervals and selecting at least two images among the plurality of images as decimation images;
    a moving vector detection step of detecting a moving vector, which is indicative of a moving direction and a moving amount of the subject, between the decimation images;
    a decimation control step of changing decimation conditions, on which the sampling is performed in the decimation step, according to an absolute value of the moving vector obtained in the moving vector detection step; and
    a synthesizing step of aligning the plurality of images based on the moving vector obtained in the moving vector detection step and then synthesizing the aligned plurality of images to obtain the composite image.

* * * * *